(12) United States Patent
Sakoda et al.

(10) Patent No.: US 6,381,234 B2
(45) Date of Patent: Apr. 30, 2002

(54) COMMUNICATION METHOD, BASE STATION AND TERMINAL APPARATUS

(75) Inventors: Kazuyuki Sakoda, Tokyo; Mitsuhiro Suzuki, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/965,963

(22) Filed: Nov. 7, 1997

(30) Foreign Application Priority Data

Nov. 8, 1996 (JP) .......................................... P08-296936

(51) Int. Cl.⁷ .................................................. H04J 3/00
(52) U.S. Cl. ........................................ 370/336; 370/345
(58) Field of Search ................................. 370/321, 322, 370/324, 326, 328, 329, 330, 336, 337, 345, 347, 348, 350, 458, 462, 465, 470, 471

(56) References Cited

U.S. PATENT DOCUMENTS

| | | | | |
|---|---|---|---|---|
| 4,763,322 A | * | 8/1988 | Eizenhofer ................... 370/337 |
| 4,914,650 A | * | 4/1990 | Sriram ........................ 370/235 |
| 5,197,125 A | * | 3/1993 | Engel et al. ................. 370/458 |
| 5,241,688 A | * | 8/1993 | Arora ......................... 455/502 |
| 5,367,524 A | * | 11/1994 | Rideout, Jr. et al. ........ 370/324 |
| 5,369,637 A | * | 11/1994 | Richardson et al. ......... 370/281 |
| 5,465,253 A | | 11/1995 | Rahnema .................... 370/68.1 |
| 5,499,243 A | * | 3/1996 | Hall ........................... 370/346 |
| 5,541,552 A | | 7/1996 | Suzuki et al. |
| 5,644,576 A | * | 7/1997 | Bauchot et al. ............. 370/437 |
| 5,694,415 A | | 12/1997 | Suzuki et al. |
| 5,732,076 A | * | 3/1998 | Ketseoglou et al. ........ 370/347 |
| 5,751,704 A | * | 5/1998 | Kostic et al. ............... 370/335 |
| 5,812,545 A | * | 9/1998 | Liebowitz et al. .......... 370/337 |

FOREIGN PATENT DOCUMENTS

EP 0507384 10/1992 ............ H04B/7/26

OTHER PUBLICATIONS

Frequency and Time Division Multiple Access with Demand–Assignment Using Multicarrier Modulation for Indoor Wireless Communications Systems, Kinugawa et al., IEICE Transactions on Communications, vol. E77–B, No. 3, pp. 396–402, Mar., 1994.

* cited by examiner

*Primary Examiner*—Kwang B. Yao
(74) *Attorney, Agent, or Firm*—Jay H. Maioli

(57) ABSTRACT

An access request to a base station or the like can be preferably performed in time division access wherein one transmission band of communication such as a wireless telephone system or the like is divided into time slots. The period of a time slot of a channel for acquiring an access right among up link channels from a terminal apparatus to a base station is made longer than the period of a time slot of other channels.

39 Claims, 13 Drawing Sheets

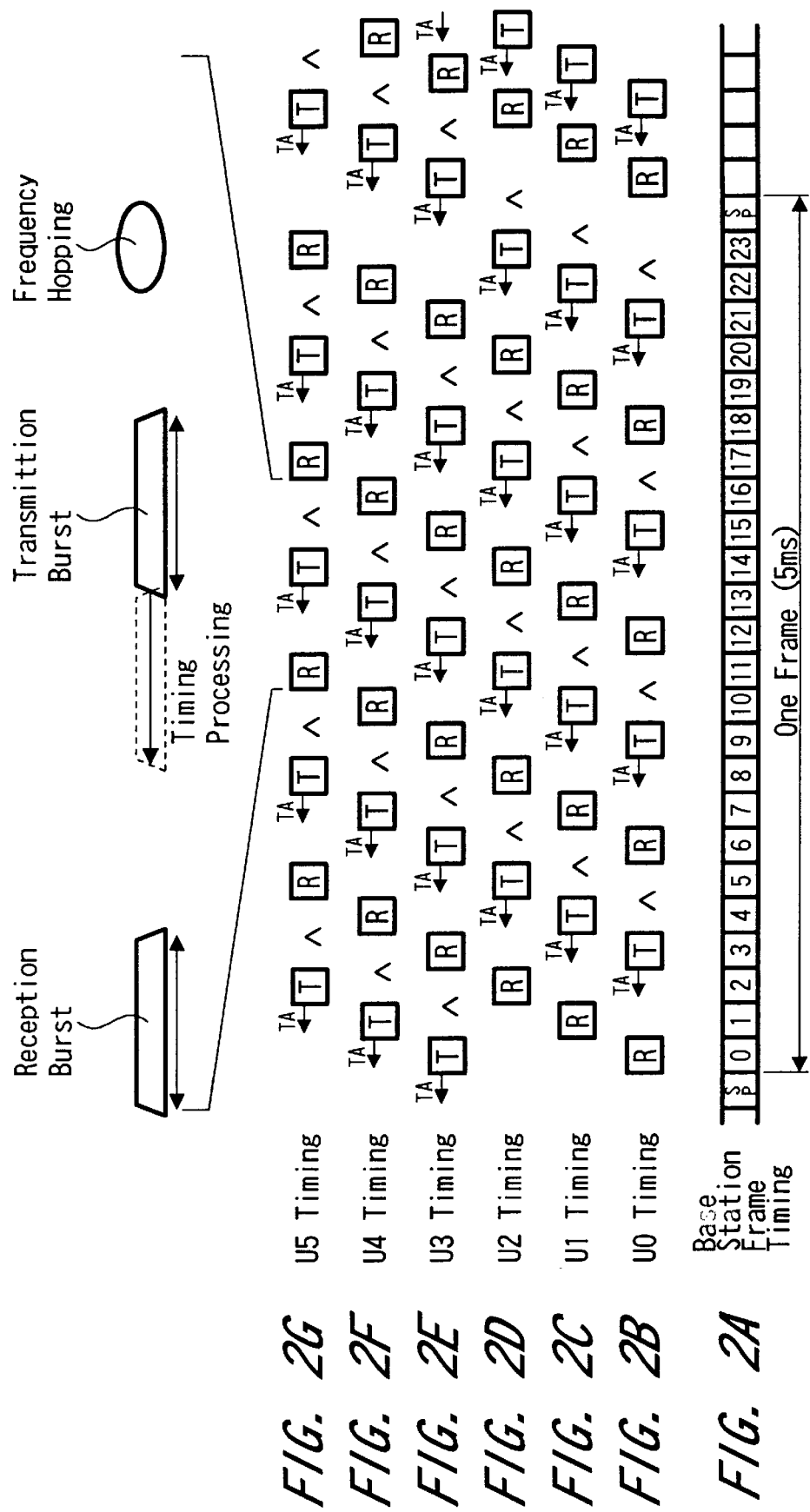

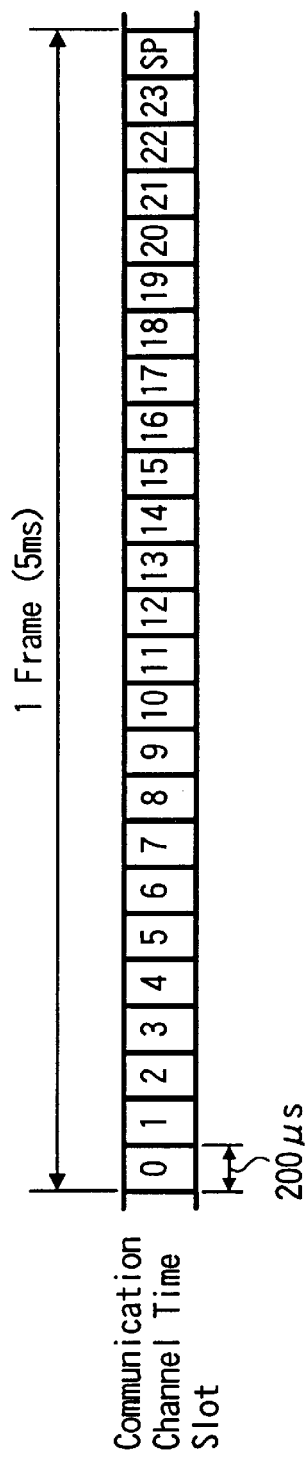
FIG. 11A Communication Channel Time Slot
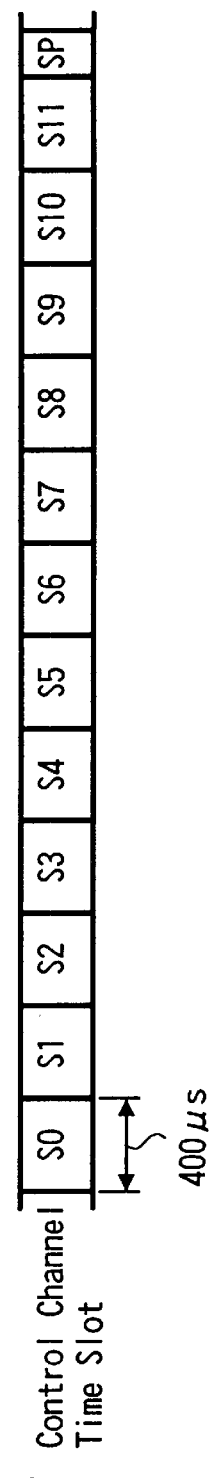
FIG. 11B Control Channel Time Slot
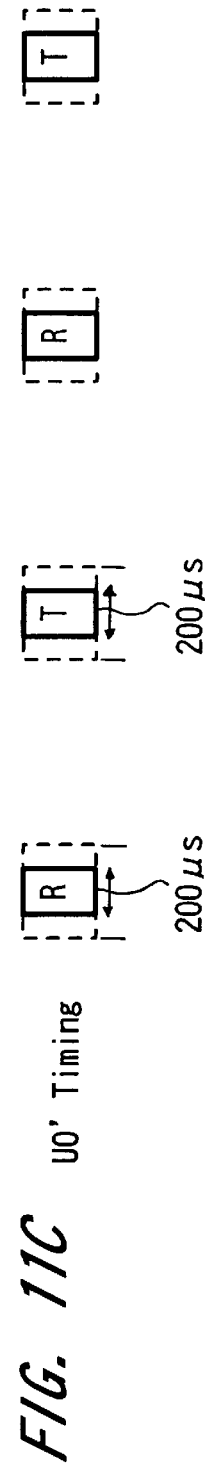
FIG. 11C U0' Timing

US 6,381,234 B2

COMMUNICATION METHOD, BASE STATION AND TERMINAL APPARATUS

BACKGROUND OF THE INVENTION

1. Field of the Invention

The present invention relates to a communication method suitable for application to, for example, a base station and a terminal apparatus in a radio telephone system, and a base station and a terminal apparatus to which the communication method is applied.

2. Description of the Related Art

In a mobile communication such as a radio telephone system or the like, a multiple access is carried out wherein a plurality of mobile stations (subscribers or terminal apparatus) have access to a single base station. In the case of the radio telephone, since a plurality of mobile stations share a single base station, a variety of communication systems have been proposed in order to avoid interference among the respective mobile stations. For example, conventional methods of communication of this type include a frequency division multiple access (FDMA), a time division multiple access (TDMA), a code division multiple access (CDMA) and so on.

According to the TDMA system, each transmission channel allocated to each base station is divided by a predetermined period of time to form a plurality of time slots in one transmission channel, and each of the time slots is allocated to a mobile station to be connected, thereby allowing simultaneous connection to a plurality of mobile stations using one transmission channel.

Further, as another system of communication, the present applicant has proposed a system of communication referred to as a band division multiple access (BDMA) (Japanese unexamined patent publication No. 8-132434 and others). Although the BDMA system will be explained in detail in preferred embodiments of the invention to be described later, briefly, it is a system wherein a plurality of transmission bands having a predetermined number of subcarrier signals arranged at predetermined frequency intervals are prepared; the signal in each of the transmission bands is segmented by a predetermined period of time to form time slots; and a burst signal is transmitted in the form of a multi-carrier signal which is data distributed among said predetermined number of subcarrier signals intermittently at the cycle of a predetermined number of time slots. The BDMA system exhibits very excellent transmission characteristics.

When the TDMA system is applied to a radio telephone system, a terminal apparatus must communicate to a base station in synchronization with a reference timing set by the base station to prevent interference between time slots of each channel. Since the distance between the terminal apparatus and the base station is not constant, even if a signal is transmitted from each terminal apparatus to the base station at the same timing, different propagation delays are caused in the signal transmitted from each terminal apparatus and hence the timing at which the base station can receive these signals varies for each channel.

Thus, there is a need for some process to correct the timing and, for example, a process has been performed wherein the base station detects the amount of delay of a signal transmitted from each terminal apparatus from the reference timing and control data is transmitted to the terminal apparatus to shift the transmission timing in accordance with the amount of delay, thereby performing correction such that reception can occur at a constant timing (a time alignment process).

However, such a time alignment process involves bidirectional data transmission and, therefore, it can be carried out only on communication in progress between a base station and a terminal apparatus. For example, it has been impossible to perform a time alignment process on an access request signal transmitted from a terminal apparatus to a base station to request the commencement of communication (access request).

Under such circumstances, a signal may be transmitted in a burst formed somewhat short in order to avoid problems associated with the transmission of a signal on which no time alignment process has been performed. Further, in the case of such a short signal burst that can not adequately absorb a shift in time caused by propagation delay, conventional methods can not solve the problem associated with time alignment.

SUMMARY OF THE INVENTION

In view of such aspects, it is an object of the present invention to allow an access request or the like to a base station to be carried out preferably for communication using an efficient system having a high transmission rate such as a radio telephone system or the like.

According to a first aspect of the present invention, a communication method of carrying out communication using a time slot as a unit includes a first communication step of using a time slot having a first time length when information of a first kind is communicated, and a second communication step of using a time slot having a second time length when information of a second kind is communicated.

According to a second aspect of the present invention, a base station in a cellular system using a time slot as a unit for communication to a subscriber station includes receiving means for receiving a signal from the subscriber station, reception processing means for carrying out a processing by a unit of a time slot having a first time length when general information is communicated and for carrying out a processing by a unit of a time slot having a second time length, which is longer than the first time length, when communication control information is communicated, signal generating means for generating a signal to be transmitted to the subscriber station, and transmitting means for transmitting the signal generated by the signal generating means to the subscriber station.

According to a third aspect of the present invention, a subscriber station in a cellular system using a time slot as a unit for communication to a base station includes reception means for receiving a signal from the base station, reception processing means for processing a signal received by the reception means, signal generating means for generating a signal formed in a unit of a time slot having a first time length when general information is communicated and for generating a signal formed in a unit of a time slot having a second time length, which is longer than the first time length, when communication control information is communicated, and transmitting means for transmitting the signal generated by the signal generating means to the base station.

BRIEF DESCRIPTION OF THE DRAWINGS

FIGS. 2A to 2G are diagrams used to explain a state of transmission in one frame according to the embodiment of FIG. 1;

FIGS. 11A to 11C are explanatory diagrams showing a configuration of a frame according to the embodiment present invention;

DESCRIPTION OF THE PREFERRED EMBODIMENT

An embodiment of the present invention will now be described with reference to the accompanying drawings.

First, a configuration of a basic communication system to which the present embodiment is applied will now be described with reference to FIGS. 1 through 3. The configuration of the communication system according to the present embodiment is a so-called multi-carrier system wherein a plurality of subcarriers are successively disposed in a band and allocated in advance wherein the plurality of subcarriers in one band are simultaneously used in one transmission path. Further, all of the plurality of subcarriers in the one band are subjected to band division to be modulated, which is referred to as a band division multiple access (BDMA) here.

Figure 1:
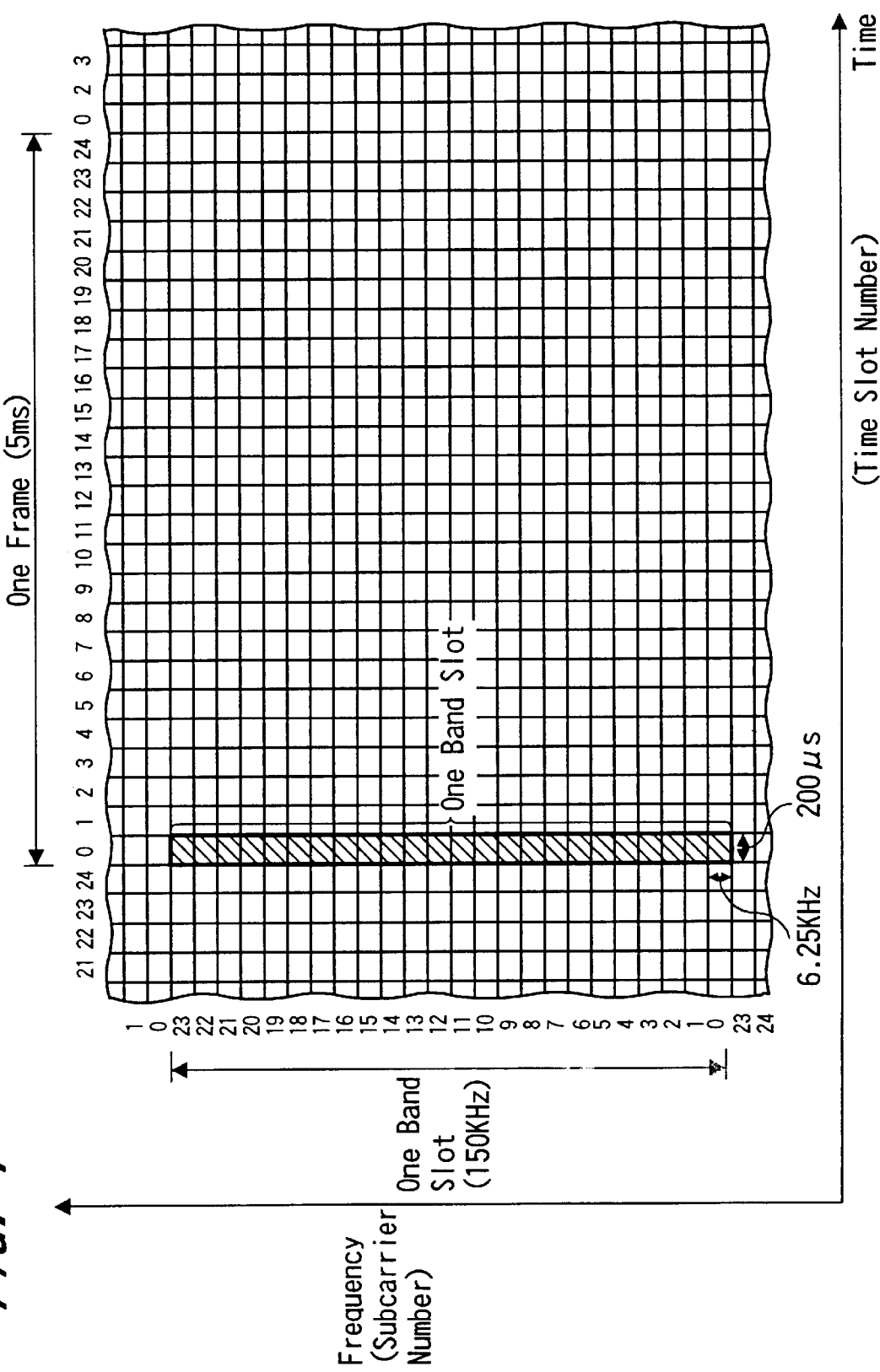
FIG. 1 is an explanatory diagram showing a configuration of slots in a transmission signal according to an embodiment of the present invention.

Referring now to the configuration, FIG. 1 is a view showing a slot configuration of a signal transmitted according to the present embodiment wherein the ordinate and the abscissa indicate a frequency and a time, respectively. In the present embodiment, there is provided an orthogonal basis wherein the frequency base and time base are divided in the form of a grid. Specifically, one transmission band (one-band slot) is set to 150 kHz, and 24 subcarriers are arranged in such one transmission band of 150 kHz. The 24 subcarriers are successively arranged at an equal interval of 6.25 kHz, and subcarrier numbers 0 through 23 are assigned to each carrier. However, there are actually provided 22 subcarriers, i.e., subcarriers No. 1 through No. 22, and subcarrier Nos. 0 and 23 on both sides of one band slot are made as guard bands in which no subcarrier is provided and for which the electric power is zero.

Referring to the time base, one time slot is defined at every 200 μsec. interval, and a burst signal is modulated into 22 subcarriers to be transmitted for each time slot. A state wherein 25 time slots (i.e., 5 msec.) are arranged is defined as one frame. Time slot numbers 0 through 24 are assigned to the time slots in one frame. The range indicated by hatching in FIG. 1 represents the section of one time slot in one band slot. Here, the time slot assigned a time slot number 24 is a period in which no data is transmitted. Further, one time slot is defined at every 200 μsec. interval as shown in FIG. 1 for a communication channel for transmitting information such as audio data or the like for control channel for transmitting only control data regarding a channel access from a mobile station, is defined at every 400 μsec. interval which is twice the above as will be described later. The detailed configuration of such a control channel will be described later.

Using this orthogonal basis wherein the frequency base and time base are divided in the form of a grid, multiple access is achieved wherein a base station communicates with a plurality of mobile stations (terminal apparatus) in the same period of time. The connection with each mobile station is made using the configuration shown in FIGS. 2A to 2G. FIGS. 2A to 2G are diagrams showing how six mobile stations (users) U0, U1, U2, . . . , U5 connected to a base station use time slots of one band slot (in practice, a band slot used is switched by frequency hopping described later), wherein a time slot indicated by R is a reception time slot; a time slot indicated by T is a transmission time slot; and a frame timing defined by the base station is set at a cycle of 24 time slots (the slot No. 24 which is the last slot of the 25 time slots prepared is not used) as shown in FIG. 2A. It is assumed here that the transmission slot and the reception slot are transmitted using separate bands.

For example, a mobile station U0 shown in FIG. 2B uses time slots No. 0, 6, 12 and 18 in one frame as reception slots, uses time slots No. 3, 9, 15 and 21 as transmission slots and receives or transmits a burst signal in each time slot. A mobile station U1 shown at in FIG. 2C uses time slots No. 1, 7, 13 and 19 in one frame as reception slots and uses time slots No. 4, 10, 16 and 22 as transmission slots. A mobile station U2 shown at in FIG. 2D uses time slots No. 2, 8, 14 and 20 in one frame as reception slots and uses time slots No. 5, 11, 17 and 23 as transmission slots. A mobile station U3 shown in FIG. 2E uses time slots No. 3, 9, 15 and 21 in one frame as reception slots and uses time slots No. 0, 6, 12 and 18 as transmission slots. A mobile station U4 shown in FIG. 2F uses time slots No. 4, 10, 16 and 22 in one frame as reception slots and uses time slots No. 1, 7, 13 and 22 as transmission slots. Further, a mobile station U5 shown in FIG. 2G uses time slots No. 5, 11, 16 and 22 in one frame as reception slots and uses time slots No. 2, 8, 14 and 20 as transmission slots.

While the configuration shown in FIGS. 2A to 2G allows a 6TDMA (time division multiple access) wherein six mobile stations are connected to one band slot, when this is viewed from the end of each mobile station, it has allowance of two time slot periods (i.e., 400 μsec.) between reception and transmission in one time slot period and the next transmission and reception and utilizes this allowance to perform a timing process and a process referred to as a frequency hopping. Specifically, in the period of about 200 μsec. preceding each transmission slot T, a timing process TA is performed to adjust the transmission timing to the timing of a signal from the base station. 200 µsec. after the end of each transmission slot T, frequency hopping is performed to switch the band slot for transmission and reception to another band slot. The timing described here is an example of a case wherein a high transmission rate is set and, if the number of band slots used is changed with the transmission rate set lower, the timing of frequency hopping and the like must be set separately. Frequency hopping allows, for example, a plurality of band slots prepared at one base station to be used by each mobile station evenly.

Specifically, a plurality of band slots are allocated to one base station. For example, in the case of a cellular type system wherein one base station constitutes one cell and a band of 1.2 MHz is allocated to one cell, eight band slots can be provided at one cell. Similarly, when a band of 2.4 MHz is allocated to one cell, 16 band slots can be provided at one cell; when a band of 4.8 MHz is allocated to one cell, 32 band slots can be provided at one cell; and when a band of 9.6 MHz is allocated to one cell, 64 band slots can be provided at one cell. A frequency switching process referred to the frequency hopping is performed such that a plurality of band slots allocated to one cell are evenly used. In the present embodiment, a plurality of band slots having continuous bands are provided at one cell.

Figures 3A, 3B:
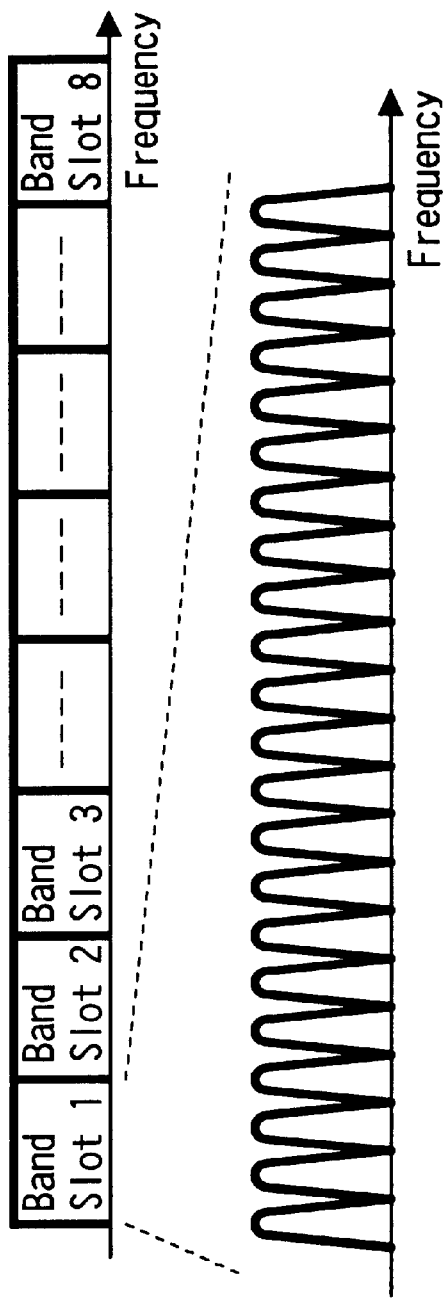
FIGS. 3A and 3B are diagrams used to explain an example of arrangement of band slots according to the embodiment of FIG. 1.

FIGS. 3A to 3B shows an example wherein eight band slots are provided at one cell and, as shown in FIG. 3A, 22 carriers are set in each of the eight band slots thus prepared to perform data transmission as shown in FIG. 3B.

By setting conditions for communication as described above, a signal transmitted between each mobile station and the base station is kept orthogonal to other signals, which prevents interference by other signals to allow a relevant signal to be preferably extracted. Further, since the band slot used for transmission is switched by frequency hopping at an appropriate time, the transmission band prepared for each base station is effectively utilized to allow efficient transmission. In this case, since an arbitrary frequency band can be allocated to one base station (cell) as described above, a system can be flexibly set depending on the situation wherein it is used.

A description will now be made on configurations of a terminal apparatus (mobile station) and a base station between which communication is performed with the above-described system configuration. The description here will be made on an assumption that a 2.0 GHz band is used as a down link from the base station to the terminal apparatus and that a 2.2 GHz band is used as an up link from the terminal apparatus to the base station.

Figure 4:
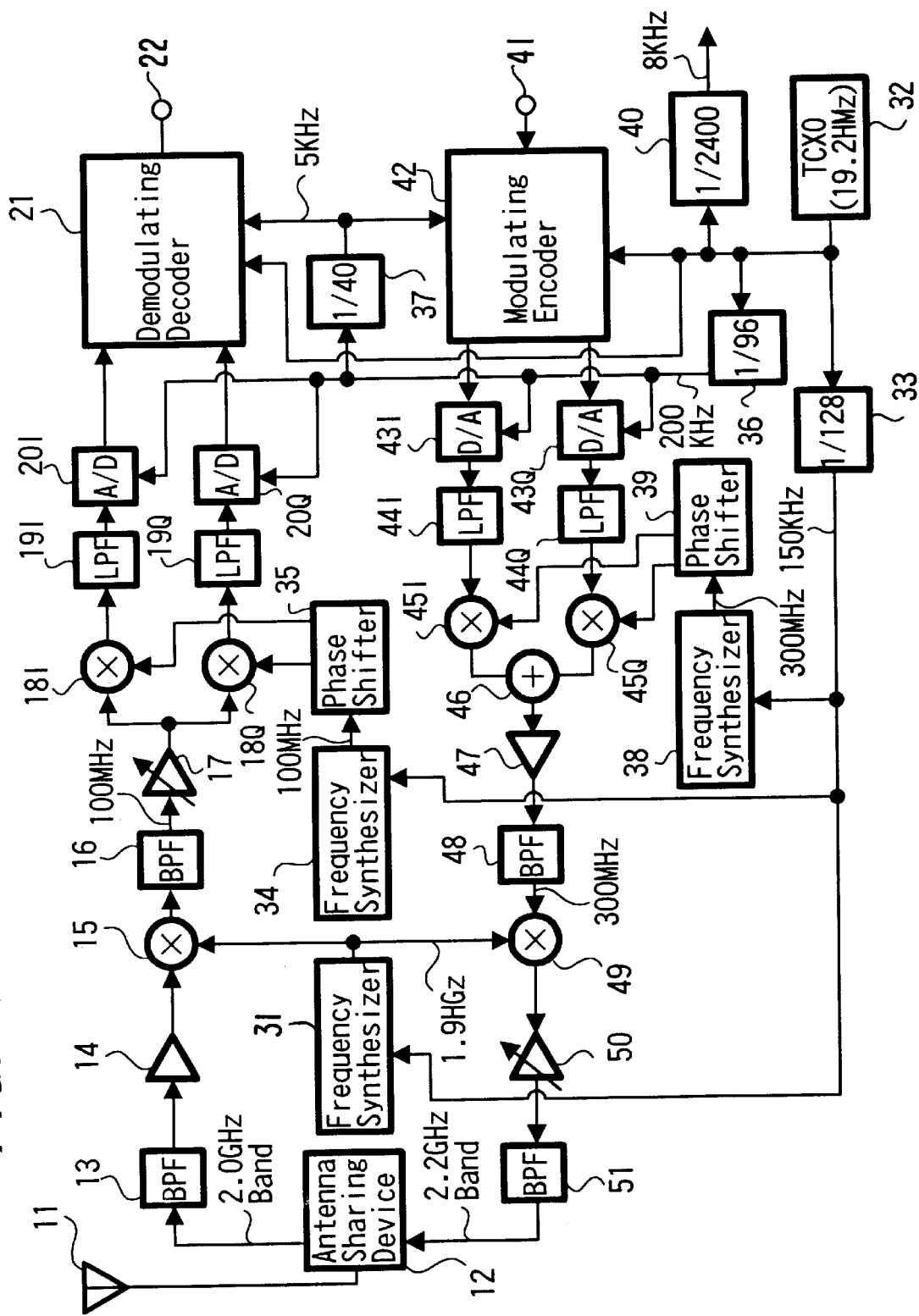
FIG. 4 is a block diagram showing a configuration of a terminal apparatus to which the embodiment of FIG. 1 of the present invention is applied.

FIG. 4 is a view showing the configuration of the terminal apparatus. Referring first to the reception system, an antenna 11 for both transmission and reception is connected to an antenna sharing device 12, and a band-pass filter 13, a reception amplifier 14, and a mixer 15 are connected in series to a reception signal output side of the antenna sharing device 12. The band-pass filter 13 extracts the 2.0 GHz band. The mixer 15 mixes a frequency signal of 1.9 GHz output by a frequency synthesizer 31 to convert the reception signal into an intermediate frequency signal of a 100 MHz band. The frequency synthesizer 31 is constituted by a PLL circuit (phase locked loop circuit) and is a synthesizer which generates signals at an interval of 150 kHz (i.e., the interval of one band slot) in a 1.9 GHz band using 150 kHz generated by dividing 19.2 MHz output from a temperature compensated reference oscillator (TCXO) 32 by a 1/128 frequency divider 33 as a reference. Other frequency synthesizers used in this terminal apparatus to be described later are also similarly constituted by a PLL circuit.

The intermediate frequency signal output by the mixer 15 is supplied to two mixers 18I and 18Q for demodulation through a band-pass filter 16 and a variable gain amplifier 17. Further, a 100 MHz frequency signal output by a frequency synthesizer 34 is converted by a phase shifter 35 into two series of signals at a 90 deg. phase shift, and one of the two series of frequency signals is supplied to the mixer 18I and the other is supplied to the mixer 18Q to be mixed with the intermediate frequency signal, thereby extracting I- and Q-components included in the received data. The frequency synthesizer 34 is a synthesizer which generates a signal in a 100 MHz band using 150 kHz generated as a result of the frequency division at the 1/128 frequency divider 33 as a reference.

The extracted I component is supplied to an analog-to-digital converter 20I through a low-pass filter 19I to be converted into digital I data. The extracted Q component is supplied to an analog-to-digital converter 20Q through a low-pass filter 19Q to be converted into digital Q data. Each of the analog-to-digital converters 20I and 20Q uses 200 kHz generated by dividing 19.2 MHz output by the TCXO 32 using a 1/96 frequency divider 36 as a clock for conversion.

The digital I data and the digital Q data output by the analog-to-digital converters 20I and 20Q are supplied to a demodulator/decoder 21 to obtain decoded reception data at a terminal 22. 19.2 MHz output by the TCXO 32 is supplied as it is to the demodulator/decoder 21 as a clock, and 5 kHz generated by dividing 200 kHz output by the 1/96 frequency divider 36 using a 1/40 frequency divider 37 is supplied thereto as a clock. This 5 kHz clock is used for generating slot timing data. Specifically, while one time slot is 200 µsec in the present embodiment as described above, one period of the signal having a frequency of 5 kHz is 200 µsec., and the slot timing data is generated in synchronization with this 5 kHz signal.

Referring now to the configuration of the transmission system of the terminal apparatus, transmission data obtained at a terminal 41 is supplied to a modulator/encoder 42 to perform a process of encoding and modulation for transmission, thereby generating digital I data and digital Q data for transmission. 19.2 MHz output by the TCXO 32 is supplied as it is to the modulator/encoder 42 as a clock, and 5 kHz generated as a result of the frequency division at the 1/40 frequency divider 37 is supplied thereto as data for generating the slot timing. The digital I data and the digital Q data output by the modulator/encoder 42 are supplied to digital-to-analog converters 43I and 43Q to be converted into an analog I signal and an analog Q signal, and the I signal and the Q signal as a result of the conversion are supplied to mixers 45I and 45Q through low-pass filters 44I and 44Q. Further, a 300 MHz frequency signal output by a frequency synthesizer 38 is converted by a phase shifter 39 into two series of signals at a 90 deg. phase shift, and one of the two series of frequency signals is supplied to the mixer 45I and the other is supplied to the mixer 45Q to be mixed with the I signal and the Q signal, respectively. This provides signals in a 300 MHz band which are subjected to orthogonal modulation at an adder 46 into a signal of one series. The frequency synthesizer 38 is a synthesizer which generates a signal in a 300 MHz band using 150 kHz generated as a result of the frequency division at the 1/128 frequency divider 33 as a reference.

The signal modulated to the 300 MHz band output by the adder 46 is supplied to a mixer 49 through a transmission amplifier 47 and a band-pass filter 48, and the 1.9 GHz band frequency signal output by the frequency synthesizer 31 is mixed therewith to convert it into a transmission frequency in a 2.2 GHz band. The transmission signal which has been subjected to frequency conversion into this transmission frequency is supplied to the antenna sharing device 12 through a transmission amplifier (variable gain amplifier) 50 and a band-pass filter 51 to be transmitted on a wireless basis from the antenna 11 connected to the antenna sharing device 12. The transmission output is adjusted by controlling the gain of the transmission amplifier 50. For example, the control of the transmission output is performed based on output control data received from the base station side.

The 19.2 MHz signal output by the TCXO 32 is supplied to a 1/2400 frequency divider 40 to be converted into an 8 kHz signal which 8 kHz signal is in turn supplied to a circuit in an audio processing system (not shown). That is, in the terminal apparatus of the present embodiment, an audio signal transmitted to and from the base station is sampled at 8 kHz (or oversampled at a frequency which is a multiple thereof), so that the 1/2400 frequency divider 40 provides clocks required for circuits for processing audio data such as an analog-to-digital converter and a digital-to-analog converter for an audio signal or a digital signal processor (DSP) for compression and decompression of audio data.

Figure 5:
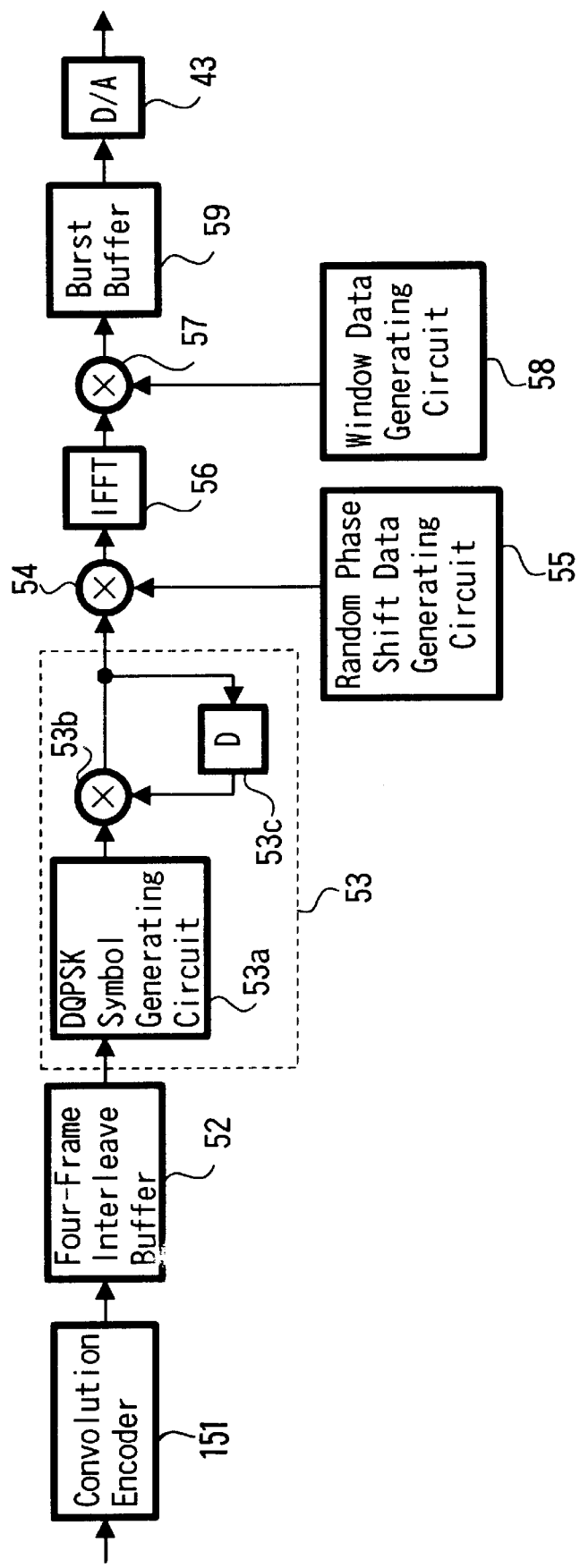
FIG. 5 is a block diagram showing a configuration of an encoder of the terminal apparatus in the embodiment shown in FIG. 4.

A description will now be made on the detailed configuration of an encoder and neighborhood thereof in the transmission system of the terminal apparatus having such a configuration with reference to FIG. 5. Transmission data is supplied to a convolutional encoder 151 to be subjected to convolutional encoding. For example, this convolutional encoding is performed on the basis that constraint length k=7 and encoding ratio R=1/3. The output of the convolutional encoder 151 is supplied to a 4-frame interleave buffer 52 to interleave the data across four frames (20 msec.). The output of the interleave buffer 52 is supplied to a DQPSK encoder 53 to perform DQPSK modulation. Specifically, based on the supplied data, a DQPSK symbol generation circuit 53a generates a symbol corresponding thereto which is supplied to one of the inputs of a multiplier 53b. The multiplication output of the multiplier 53b is delayed by a delay circuit 53c by one symbol and is returned to the other input to perform the DQPSK modulation. The DQPSK-modulated data is supplied to a multiplier 54 where a process is performed to multiply the modulated data by random phase-shift data output by a random phase-shift data generation circuit 55. Thus, the apparent phase of the data is randomly varied.

Then, the output of the multiplier 54 is supplied to an inverse fast Fourier transformation circuit (IFFT circuit) 56, and the inverse FFT circuit 56 converts data on a frequency base into the data on time base through the calculation using the inverse fast Fourier transformation to obtain a so-called multi-carrier signal including 22 subcarriers at a 6.25 kHz interval obtained by modulation. The IFFT circuit that carries out the inverse fast Fourier transformation can be relatively simply implemented with a configuration that allows subcarriers in a quantity which is a power of 2. The IFFT circuit 56 used in the present embodiment has a capability of generating 32 subcarriers which is $2^5$ and, in the process of transmitting the information channel, outputs a signal obtained by modulating data to 22 successive subcarriers of them.

The modulation rate for the transmission data processed by the IFFT circuit 56 in the present embodiment is set to 200 kHz, and a process is performed to convert a signal at the modulation rate of 200 kHz into 32 multi-carriers which become 200 kHz÷32=6.25 kHz. Thus, a multi-carrier signal at the 6.25 kHz interval (12.5 kHz interval in case of the up link control channel) is obtained.

Figures 6A, 6B:
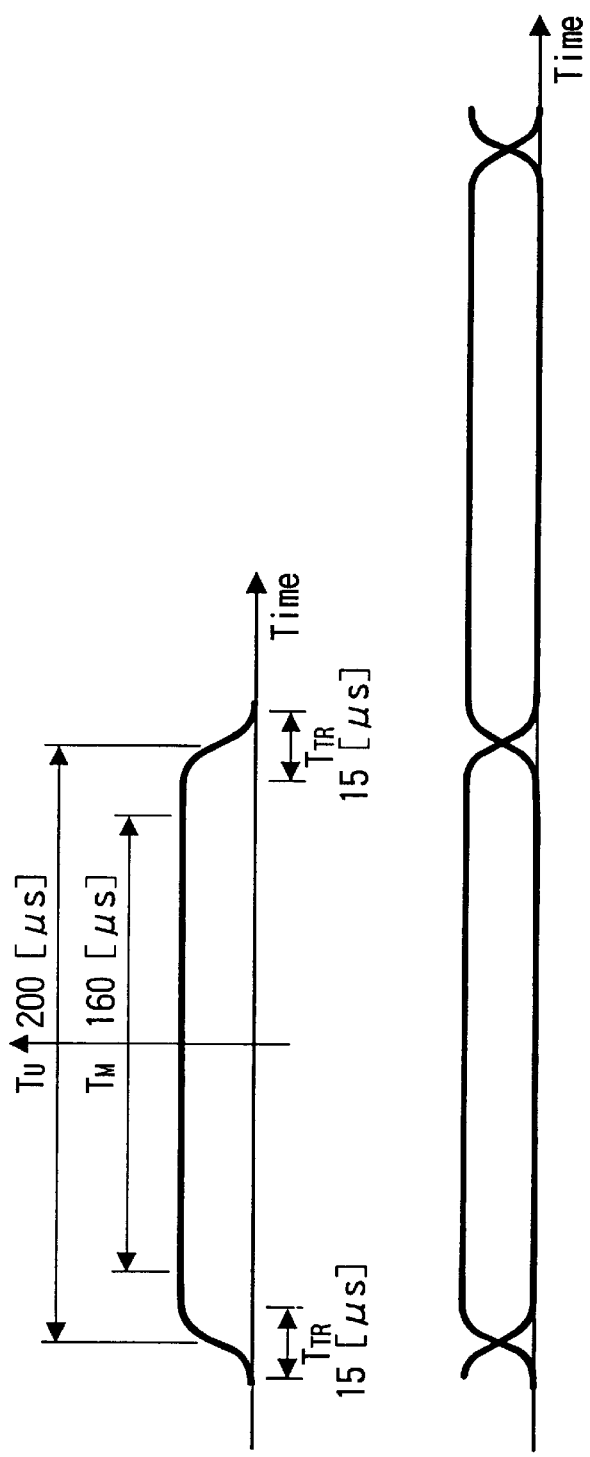
FIGS. 6A and 6B are waveform diagrams showing an example of window data.

The multi-carrier signals converted by the inverse fast Fourier transformation into that on time base is supplied to a multiplier 57 to be multiplied by a time waveform output by a window data generation circuit 58. As shown in FIG. 6A, for example, this time waveform is a waveform having a length $T_U$ of about 200 μsec. (i.e., one time slot period) of one wave at the transmitting side. However, the level of the waveform varies gently on both ends $T_{TR}$ (about 15 μsec.) thereof and, as shown in FIG. 6B, the waveform partially overlaps adjacent time waveforms when the time waveform is multiplied.

Referring again to FIG. 5, the signal which has been subjected to multiplication of the time waveform at the multiplier 57 is supplied to a digital-to-analog converter 43 (corresponding to the digital-to-analog converters 43I and 43Q in FIG. 4) through a burst buffer 59 to be converted into an analog signal using 200 kHz as a clock for conversion.

Figure 7:
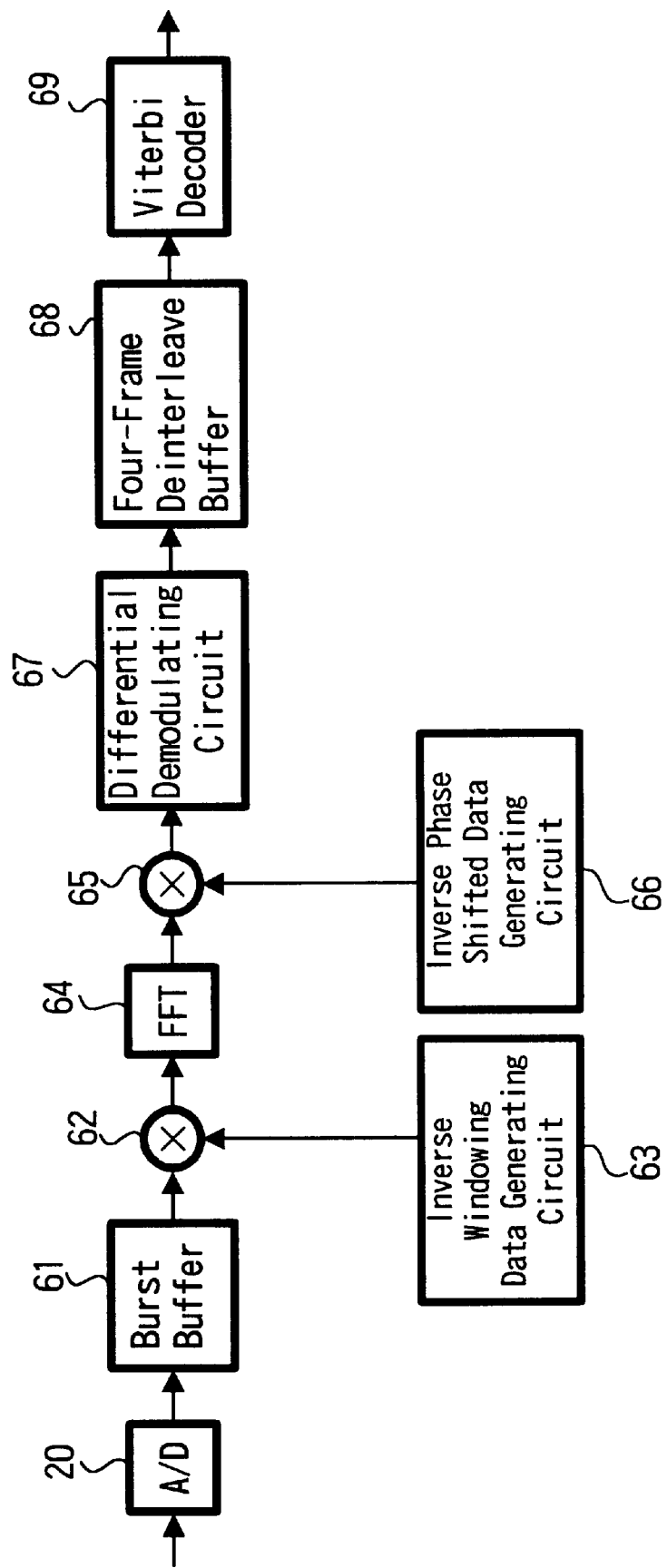
FIG. 7 is a block diagram showing a configuration of a decoder of the terminal apparatus of the embodiment in FIG. 4.

The detailed configuration of a decoder and neighborhood thereof in the reception system of the terminal apparatus according to the present embodiment will be described with reference to FIG. 7. Digital data which has been converted by an analog-to-digital converter 20 (corresponding to the analog-to-digital converters 20I and 20Q in FIG. 4) using a clock of 200 kHz is supplied to a multiplier 62 through a burst buffer 61 to be multiplied by a time waveform output by a reverse window data generation circuit 63. The time waveform multiplied at the reception is a time waveform which has a configuration as shown in FIG. 6A but has a length $T_M$ of 160 μsec. to be shorter than that at the transmission.

The reception data multiplied by the time waveform is supplied to an FFT circuit 64 where it is subjected to a process of converting data on the time base into the data on the frequency base through a fast Fourier transformation process. Thus, the time-series data transmitted after being modulated into 22 subcarriers at the 6.25 kHz interval is converted into data of respective subcarriers. Like the conversion process at the IFFT circuit in the transmission system, the conversion process here employs a capability of processing 32 subcarriers which is $2^5$, and the data modulated into 22 successive subcarriers out of them is converted and output. The modulation rate for the transmission data processed by the FFT circuit 64 in the present embodiment is 200 kHz, and a process of converting a multi-carrier signal at the 6.25 kHz interval can be performed because 32 multi-carriers can be processed, i.e., 200 kHz÷32=6.25 kHz.

The reception data which has been subjected to the fast Fourier transformation at the FFT 64 is supplied to a multiplier 65 where it is multiplied by reverse random phase shift data (this data is data that varies in synchronization with the random phase shift data at the transmitting side) output by a reverse random phase shift data generation circuit 66 to be returned to data having the original phase.

The data returned to the original phase is supplied to a differential demodulation circuit 67 to be subjected to differential demodulation, and the data which has been subjected to the differential demodulation is supplied to a 4-frame deinterleave buffer 68 where the data interleaved across four frames at the time of transmission is returned to the original data arrangement. The deinterleaved data is supplied to a Viterbi decoder 69 to be subjected to Viterbi decoding. The Viterbi-decoded data is supplied to a subsequent reception data processing circuit (not shown) as decoded reception data.

The configuration of the base station will now be described with reference to FIG. 8. The configuration used in this base station to perform transmission and reception is basically similar to that in the terminal apparatus except for a configuration which is used for achieve multiple access wherein it is connected to a plurality of terminal apparatuses simultaneously.

Figure 8:
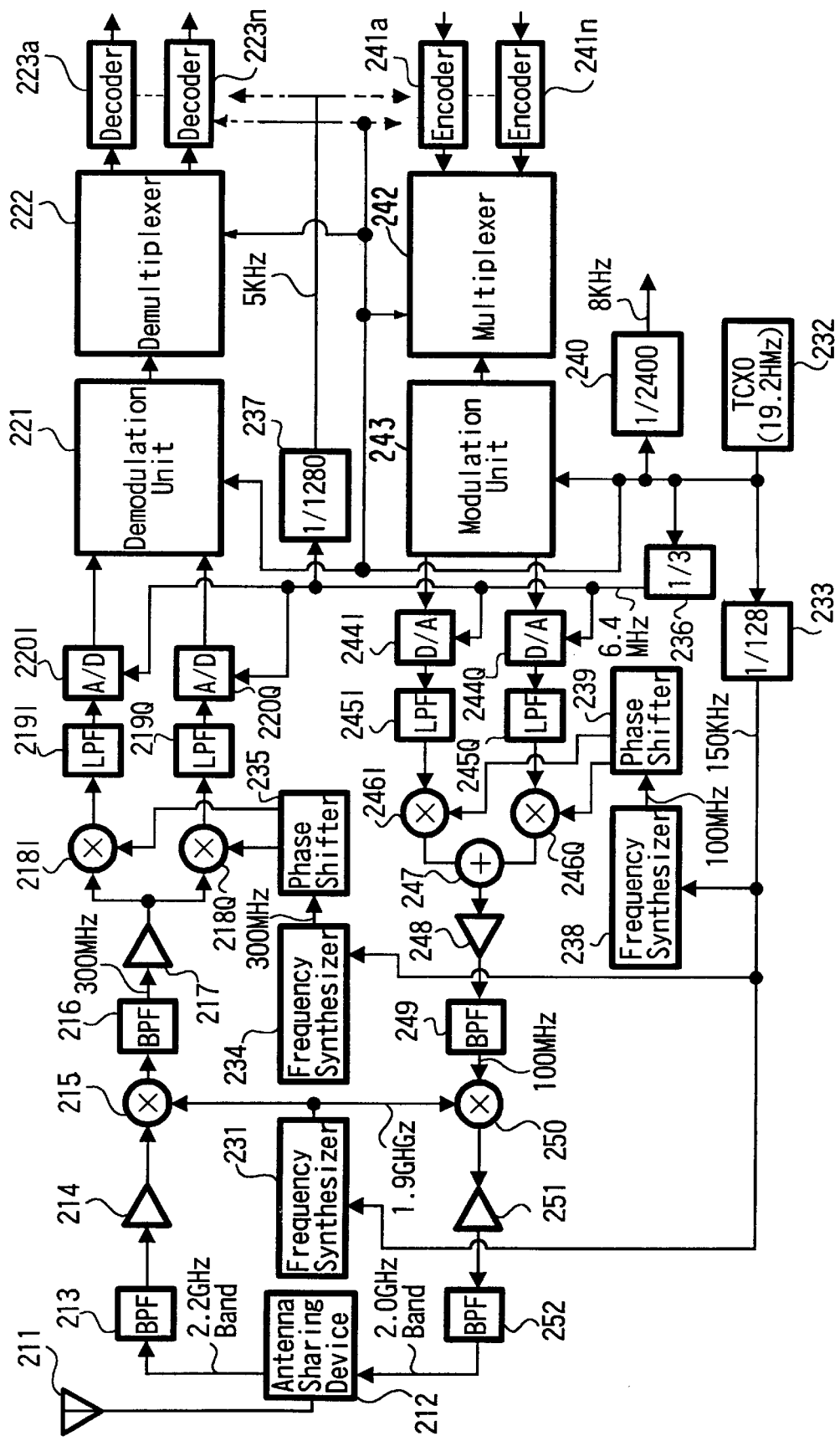
FIG. 8 is a block diagram showing a configuration of a base station to which another embodiment of the present invention is applied.

Referring first to the configuration of the reception system shown in FIG. 8, an antenna 211 for both transmission and reception is connected to an antenna sharing device 212, and a band-pass filter 213, a reception amplifier 214, and a mixer 215 are connected in series to a reception signal output side of the antenna sharing device 212. The band-pass filter 213 extracts the 2.2 GHz band. The mixer 215 mixes a frequency signal of 1.9 GHz output by a frequency synthesizer 231 to convert the reception signal into an intermediate frequency signal in a 300 MHz band. The frequency synthesizer 231 is constituted by a PLL circuit (phase locked loop circuit) and is a synthesizer which generates a signal at an interval of 150 kHz (i.e., the interval of one band slot) in a 1.9 GHz band using 150 kHz generated by dividing 19.2 MHz output from a temperature compensated reference oscillator (TCXO) 232 by a 1/128 frequency divider 233 as a reference. Other frequency synthesizers used in this base station to be described later are also similarly constituted by a PLL circuit.

The intermediate frequency signal output by the mixer 215 is supplied to two mixers 218I and 218Q for demodulation through a band-pass filter 216 and a reception amplifier 217. Further, a 300 MHz frequency signal output by a frequency synthesizer 234 is converted by a phase shifter 235 into two series of signals at a 90 deg. phase shift, and one of the two series of frequency signals is supplied to the mixer 218I and the other is supplied to the mixer 218Q to be mixed with the intermediate frequency signal, thereby extracting I- and Q-components included in the received data. The frequency synthesizer 234 is a synthesizer which generates a signal in a 300 MHz band using 150 kHz generated as a result of the frequency division at the 1/128 frequency divider 233 as a reference.

The extracted I component is supplied to an analog-to-digital converter 220I through a low-pass filter 219I to be converted into digital I data. The extracted Q component is supplied to an analog-to-digital converter 220Q through a low-pass filter 219Q to be converted into digital Q data. Each of the analog-to-digital converters 220I and 220Q uses 6.4 MHz generated by dividing 19.2 MHz output by the TCXO 232 using a 1/3 frequency divider 236 as a clock for conversion.

The digital I data and the digital Q data output by the analog-to-digital converters 220I and 220Q are supplied to a demodulation unit 221, and the demodulated data is supplied to a demultiplexer 222 to be divided into data from each terminal apparatus. The divided data is separately supplied to decoders 223a, 223b, . . . , 223n prepared in the same number (6 per one band slot) as the terminal apparatuses connected simultaneously. 19.2 MHz output by the TCXO 232 is supplied as it is to the demodulation unit 221, the demultiplexer 222 and the decoders 223a, 223b, . . . , 223n as a clock, and 5 kHz generated by dividing 6.4 MHz output by the 1/3 frequency divider 236 using a 1/1280 frequency divider 237 is supplied thereto as slot timing data.

Referring now to the configuration of the transmission system of the base station, transmission data separately encoded by encoders 241a, 241b, . . . , 241n prepared in the same number as the parties (terminal apparatuses) to communicate simultaneously is synthesized by a multiplexer 242. The output of the multiplexer 242 is supplied to a modulation unit 243 which performs a modulation process for transmission to generate digital I data and digital Q data for transmission. A signal having a frequency of 19.2 MHz and output by the TCXO 232 is supplied as it is to each of the encoders 241a through 241n, the multiplexer 242 and the modulation unit 243 as a clock, and 5 kHz output by the 1/1280 frequency divider 237 is supplied thereto as a clock.

The digital I data and the digital Q data output by the modulation unit 243 are supplied to digital-to-analog converters 244I and 244Q to be converted into an analog I signal and an analog Q signal, and the I signal and the Q signal as a result of the conversion are supplied to mixers 246I and 246Q through low-pass filters 245I and 245Q. Further, a signal having a frequency of 100 MHz and output by a frequency synthesizer 238 is converted by a phase shifter 239 into two series of signals phase-shifted apart by 90°, and one of the two series of signals is supplied to the mixer 246I and the other is supplied to the mixer 246Q to be mixed with the I signal and the Q signal, respectively. This provides signals in a 100 MHz band which are subjected to orthogonal modulation at an adder 247 into one series of signal. The frequency synthesizer 238 is a synthesizer which generates a signal in a 100 MHz band using 150 kHz generated as a result of the frequency division at the 1/128 frequency divider 233 as a reference.

The signal modulated to the 100 MHz band output by the adder 247 is supplied to a mixer 250 through a transmission amplifier 248 and a band-pass filter 249, and the 1.9 GHz band frequency signal output by the frequency synthesizer 231 is mixed therewith to convert it into a transmission frequency in a 2.0 GHz band. The transmission signal which has been subjected to frequency conversion into this transmission frequency is supplied to the antenna sharing device 212 through a transmission amplifier 251 and a band-pass filter 252 to be transmitted on a wireless basis from the antenna 211 connected to the antenna sharing device 212.

The 19.2 MHz signal output by the TCXO 232 is supplied to a 1/2400 frequency divider 240 to be converted into an 8 kHz signal which 8 kHz signal is in turn supplied to a circuit in an audio processing system (not shown). That is, in the base station of the present embodiment, an audio signal transmitted to and from a terminal apparatus is sampled at 8 kHz (or oversampled at a frequency which is a multiple thereof), so that the 1/2400 frequency divider 240 provides clocks required for circuits for processing audio data such as an analog-to-digital converter and a digital-to-analog converter for an audio signal or a digital signal processor (DSP) for compression and decompression of audio data.

Figure 9:
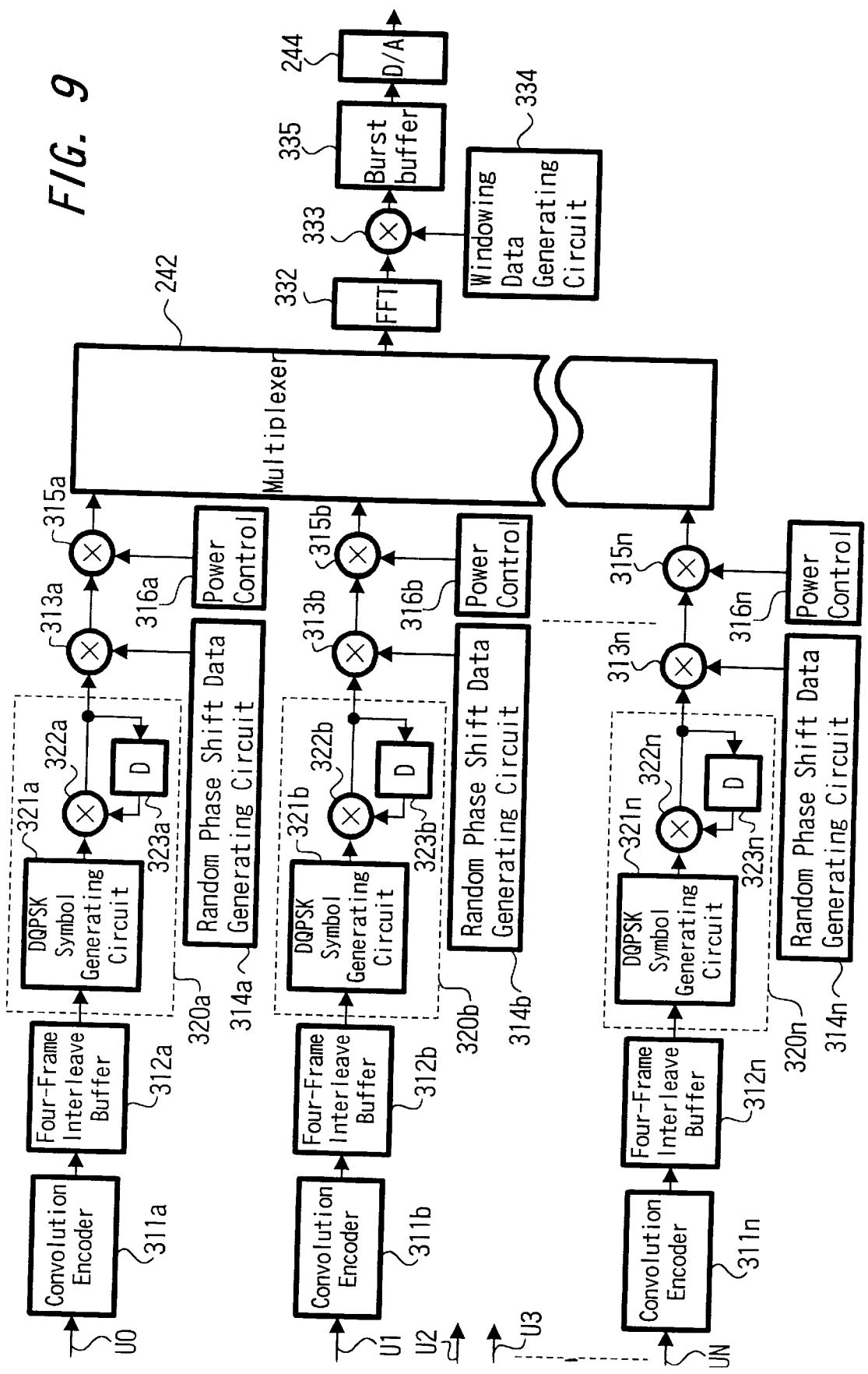
FIG. 9 is a block diagram showing a configuration for modulation processing in the base station of the embodiment in FIG. 8.

A description will now be made on the details of a configuration for encoding and modulating transmission data at the base station with reference to FIG. 9. It is assumed here that simultaneous multiple access is established to N (N is an arbitrary number) terminal apparatuses (users). Signals U0, U1, . . . , UN to be transmitted to the user at each terminal apparatus are respectively supplied to separate convolutional encoders 311a, 311b, . . . 311n to be subjected to convolutional encoding separately. For example, this convolutional encoding is performed on the basis that constraint length k=7 and encoding ratio R=1/3.

The data which have been subjected to convolutional encoding in respective systems are respectively supplied to 4-frame interleave buffers 312a, 312b, . . . , 312n to interleave the data across four frames (20 msec.). The outputs of the respective interleave buffers 312a, 312b, ..., 312n are supplied to respective DQPSK encoders 320a, 320b, ..., 320n to perform DQPSK modulation. Specifically, based on the supplied data, DQPSK symbol generation circuits 321a, 321b, ..., 321n generate symbols corresponding thereto which are supplied to one inputs of multipliers 322a, 322b, ..., 322n. The multiplication outputs of the multipliers 322a, 322b, ..., 322n are delayed by respective delay circuits 323a, 323b, ..., 323n by one symbol and are returned to the other inputs to perform the DQPSK modulation. The DQPSK-modulated data are respectively supplied to multipliers 313a, 313b, ..., 313n where a process is performed to multiply the modulated data by random phase-shift data separately output by random phase-shift data generation circuits 314a, 314b, ..., 314n. Thus, the apparent phase of the data is randomly varied.

Then, the output of each of the multipliers 313a, 313b, ..., 313n is supplied to a multiplexer 242 to be synthesized therein. During the synthesis at the multiplexer 242 of the present embodiment, the positions of the frequencies to be synthesized can be switched using 150 kHz as a unit, such switching is controlled to switch the frequency of a burst signal transmitted to each terminal apparatus. That is, while frequency switching on a band slot basis referred to as the frequency hopping is performed in the present embodiment as shown in FIG. 2, such frequency switching is achieved by switching the processes performed during the synthesis at the multiplexer 242.

The data synthesized by the multiplexer 242 is supplied to an IFFT circuit 332 which converts a signal on a frequency base into a signal on the time base through the calculation using the inverse fast Fourier transformation to obtain a time series data formed of the multi-carrier signal obtained by modulating data into 22 subcarriers at the 6.25 kHz interval per band slot. The data obtained by the inverse fast Fourier transformation is supplied to a multiplier 333 to be multiplied by a time waveform output by a window data generation circuit 334. As shown in FIG. 6A, this time waveform is a waveform having a length $T_U$ of about 200 μsec. (i.e., one time slot period) of one wave at the transmitting side. However, the level of the waveform varies gently on both ends $T_{TR}$ (about 15 μsec.) thereof and, as shown in FIG. 6B, the waveform partially overlaps adjacent time waveforms when the time waveform is multiplied.

The signal which has been subjected to multiplication of a time waveform at the multiplier 333 is supplied to a digital-to-analog converter 244 (corresponding to the converters 244I and 244Q in FIG. 8) through a burst buffer 335 to be converted into an analog I signal and an analog Q signal which are transmitted with the configuration shown in FIG. 8.

Figure 10:
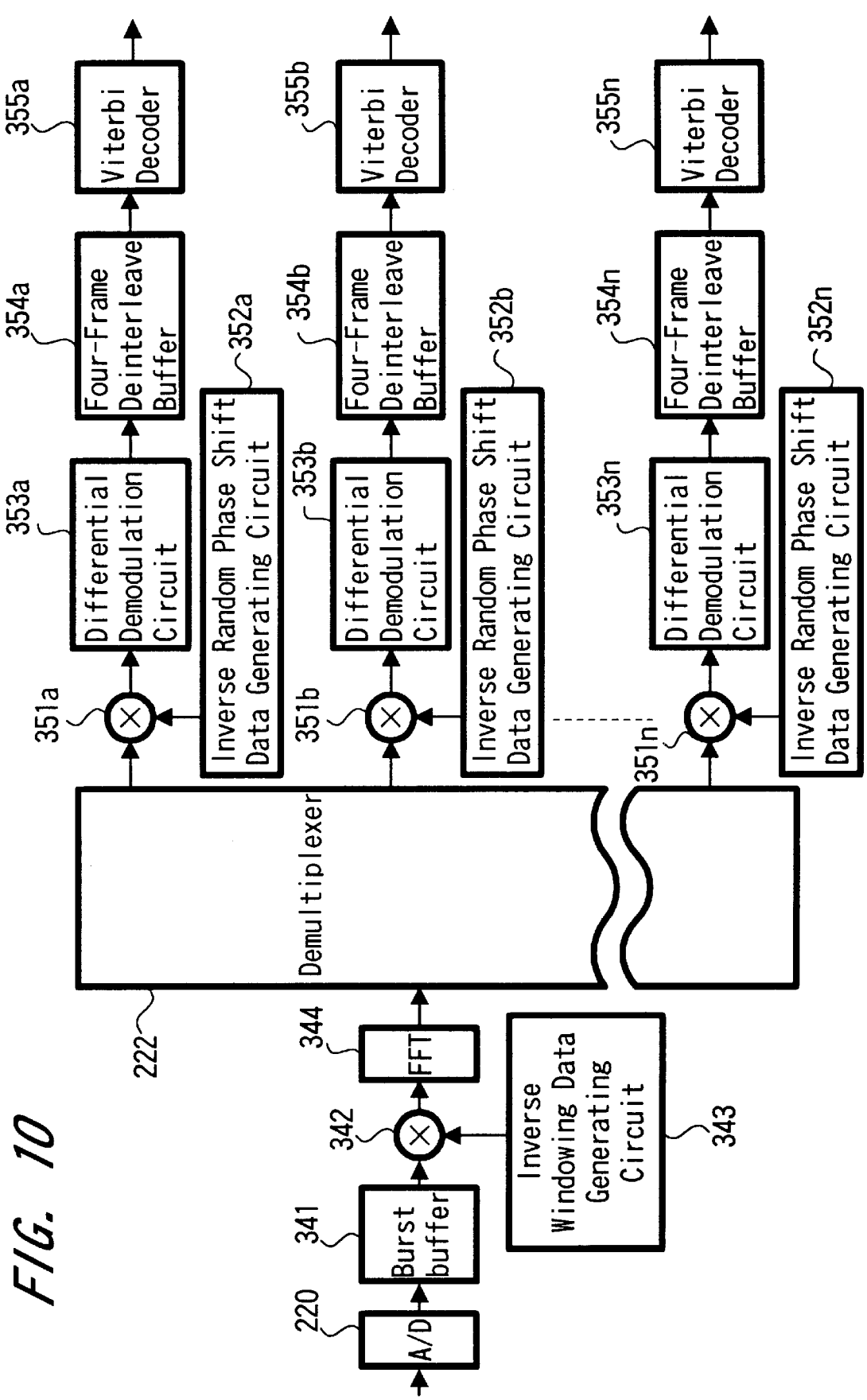
FIG. 10 is a block diagram showing a configuration for demodulation processin in the base station of the embodiment in FIG. 8.

Next, the details of a configuration for demodulating and decoding reception data at the base station will be described with reference to FIG. 10. The digital I data and the digital Q data which have been converted by an analog-to-digital converter 220 (corresponding to the analog-to-digital converters 220I and 220Q in FIG. 8) is supplied to the multiplier 342 through a burst buffer 341 to be multiplied by a time waveform output by a inverse window data generation circuit 343. This time waveform is a time waveform which has a configuration as shown in FIG. 6A but has a length $T_M$ of 160 μsec. which is shorter than that at the transmission.

The reception data multiplied by the time waveform is supplied to an FFT circuit 344 where it is subjected to a process of converting data on the time base into data on the frequency base through a fast Fourier transformation process. Thus, the data transmitted after being modulated into 22 subcarriers at the 6.25 kHz intervals per band slot is converted into data of the respective subcarriers. This data which has been subjected to the fast Fourier transformation is supplied to the demultiplexer 222 to obtain data which is divided by a number corresponding to the number of terminal apparatuses for which simultaneous multiple access is provided. During the division at the multiplexer 222 of the present embodiment, the positions of the frequencies to be divided can be switched using 150 kHz as a unit, such switching is controlled to switch the frequency of a burst signal transmitted from each terminal apparatus. That is, while frequency switching on a band slot basis referred to as the frequency hopping is periodically performed in the present embodiment as shown in FIG. 9 and etc., such frequency switching at the transmitting side is achieved by switching the processes performed during the division at the demultiplexer 222.

The respective reception data which have been divided by the demultiplexer 222 are separately supplied to multipliers 351a, 351b, ..., 351n provided in a number N of the terminal apparatuses for which simultaneous multiple access is provided. At the multipliers 351a, 351b, ..., 351n, the data are multiplied by reverse random phase shift data (the data also data that varies in synchronization with the random phase shift data at the transmitting side) output by reverse random phase shift data generation circuits 352a, 352b, ..., 352n to be returned to data having the original phase in the respective systems.

The data are supplied to differential demodulation circuits 353a, 353b, ..., 353n to be subjected to differential demodulation, and the data which have been subjected to the differential demodulation are supplied to 4-frame deinterleave buffers 354a, 354b, ..., 354n where the data interleaved across four frames at the time of transmission are returned to the original data arrangement. The deinterleaved data are supplied to Viterbi decoders 355a, 355b, ..., 355n to be subjected to Viterbi decoding. The Viterbi-decoded data are supplied to a subsequent reception data processing circuit (not shown) as decoded reception data.

A description will now be made on the details of a configuration of a data frame transmitted from a terminal apparatus according to the present embodiment. As already described with reference to FIG. 3, one frame is 5 msec. in the present embodiment, and such one frame is divided into 25 time slots from 0 to 24 as shown in FIG. 11A. Thus, one time slot is 200 μsec. A time slot of 200 μsec is used when audio data for conversation and various kinds of information are transmitted between the base station and the terminal apparatus through a channel prepared as a communication channel. In the present embodiment, for a control channel for transmitting control data between the terminal apparatus and the base station (for example, this control channel is a predetermined channel determined in advance for each base station), transmission is carried out with the configuration shown in FIG. 11B.

Specifically, one time slot is established as 400 μsec. that corresponds to two time slot periods of a communication channel, and 12 time slot periods S0, S1, S2, S11 and a space SP of 200 μsec. (non-transmission period) are set in one frame period such that they do not exceed one frame of the communication channel. This time slot configuration is repeated for each frame period. One such time slot of 400 μsec. is used as a reception slot R and another as a transmission slot T at a cycle of three slots. FIG. 11C indicates timing at which a certain terminal apparatus U0' communicates with the base station using a control channel. Time slots No. S0 and S6 are used as the reception slots, and time slots No. S3 and S9 are used as the transmission slots. Although the space SP for 200 μsec. is set in the control channel so that the frame periods of the communication and control channels are matched, it is not essential to provide such a space.

When communication is carried out through the control channel, as indicated by the broken line in FIG. 11C, one time slot prepared is not entirely used for transmission and reception, and a burst signal for 200 μsec. which is one half of the one time slot period is transmitted instead as shown in FIG. 11C by the solid line. The burst signal for 200 μsec. in the communication channel has a configuration which is basically the same as that of the burst signal for 200 μsec. transmitted during one slot period in the case of the communication channel. For example, the burst signal for 200 μsec in the communication channel is transmitted such that it is located at the first half of one time slot period of the control channel.

For example, the data transmitted through such a control channel is control data transmitted from a terminal apparatus to the base station in the case of an up link control channel from the terminal apparatus to the base station. Such control data include data for requesting access from a terminal apparatus to the base station. For example, when a terminal apparatus is to initiate transmission, data requesting such an access is transmitted to the base station using this up link control channel, then, acknowledging the access request, data is transmitted from the base station using a down link control channel. When the acknowledgment data is transmitted, a communication channel specified by channel specification data which is simultaneously transmitted is used to initiate communication between the terminal apparatus and the base station. Other various kinds of data such as data for calling a terminal apparatus from the base station and so on are also transmitted using this control channel.

As in case of a communication channel, frequency (channel) switching referred to as the frequency hopping may be also performed upon the transmission on this control channel. Alternatively, the frequency may be fixed for the channel prepared as a control channel for which therefore no frequency hopping is performed.

Figure 12A:
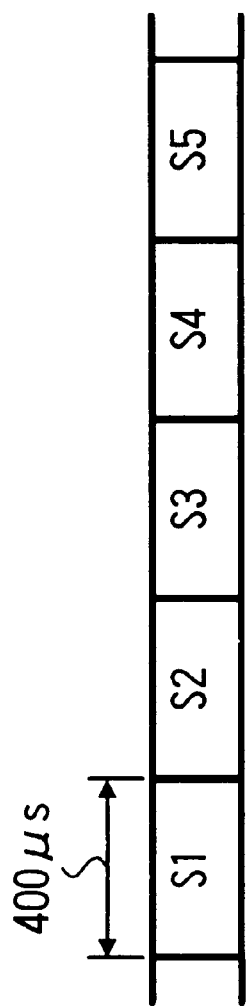
FIGS. 12A and 12B are explanatory diagrams showing an example of a control channel received at a base station according to the present invention and FIGS. 13A and 13B are explanatory diagram showing a configuration of one band slot according to an present invention.
Figure 12B:
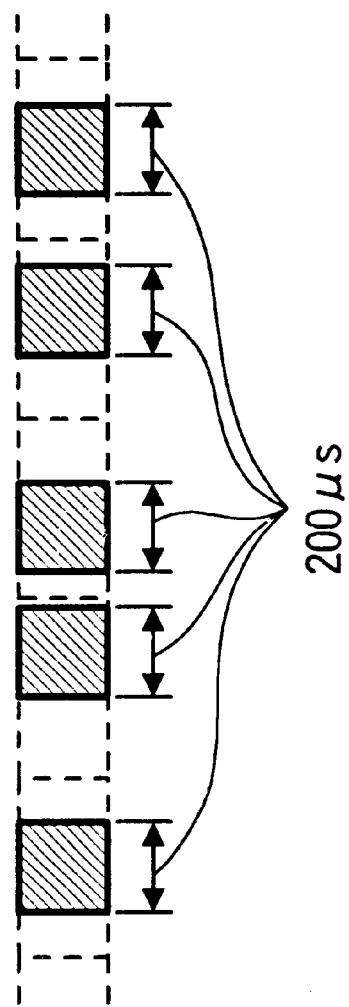

FIGS. 12A and 12B show the state of a control channel received at the base station. For example, let us assume that the reference timing of the time slots of the control channel is set at a cycle of 400 μsec. as shown in FIG. 12A. Then, since the state of the transmission paths between the terminal apparatuses as transmitters and the base station varies depending on the terminal apparatuses, the timing at which burst signals for 200 μsec transmitted by the terminal apparatuses (reception takes place at timing in the range indicated by solid lines in FIG. 12B) is likely to be different for each terminal apparatus. In the present embodiment, however, since significant allowance is set by setting one slot period equal to twice the period of a burst signal transmitted, there is no possibility that transmission data in adjoining time slot periods will overlap each other unless there is a shift in timing in the excess of the allowance. This allows the base station to accurately receive data transmitted in each time slot period.

Further, since a control channel includes such allowance period, no time alignment process is carried out. Specifically, when the base station communicates with a terminal apparatus using a communication channel, the base station detects the timing for reception of the signal transmitted by the terminal apparatus, determines any deviation between the reception timing and the reference timing and adds data for correcting the deviation as an additional data. The terminal apparatus performs a time alignment process wherein the timing of transmission to the base station is corrected by the amount specified by the timing correction data as the additional data to allow accurate time division multiplex reception at the base station. On the other hand, such a time alignment process is not performed for a control channel because it includes an allowance period as described above which allows the base station to perform accurate time division multiplex reception without the time alignment process.

As described above, with a control channel according to the present invention, control data including data for acquiring an access right and the like can be transmitted from a terminal apparatus to the base station in a relatively good state of communication, and a relevant signal can be reliably transmitted to the base station even if a time alignment process or the like is not performed. Especially, it is possible to reliably transmit data for acquiring an access right (access request signal) which must be transmitted without a time alignment process to the base station. Thus, a process of allowing access to a base station can be reliably performed where an efficient transmission system is employed as in the present embodiment.

In this case, the data length of a burst signal actually transmitted in one time slot of a control channel is set to the same length as those of other channels. This allows a process of producing a signal transmitted through a control channel at a terminal apparatus or base station to be carried out through the same process as processes of producing signals transmitted through other channels, and what is required is only to set the process associated with the transmission and reception timing (periods of transmission and reception) such that it accommodates a control channel. Thus, it is possible to transmit and receive a control channel using circuits for transmission and reception prepared for a communication channel. Therefore, the configuration of a control channel according to the present embodiment results in substantially no increase in the complexity of the configuration of a terminal apparatus or base station.

With the configuration of a control channel according to the present embodiment, the amount of data that can be transmitted through a control channel is about one-half that through a communication channel. However, this creates no problem because the amount of data to be simultaneously transmitted by the control channel is not so much.

Although the time slot period of the control channel is twice the time slot period of other channels in the above-described embodiment, the period the control channel may be :other integer multiples such as triple and quadruple or the like. However, the amount of information that can be transmitted through the same band decreases as the time slot period is elongated. Further, the time slot period of a control channel may be other than integer multiples of the time slot period of other channels. In addition, the time slot period of control channels in the same system may be set to be varied for each station or area. In this case, it will be possible to inform each terminal apparatus of the time slot period of such an area base station using a broadcast channel or the like.

Furthermore, although the time slot period is longer for the control channel in the above-described embodiment, a down link control channel from a base station may be transmitted with the same time slot period as that of communication channels with only the up link channel from each terminal apparatus to the base station maintained at the time slot period as shown in FIG. 11B because data transmission from the base station to each terminal apparatus can be performed at the base station at an accurate time slot cycle in synchronism with the reference timing and therefore not so much allowance is required for data transmission from the base station through the down link control channel.

Figure 13A:
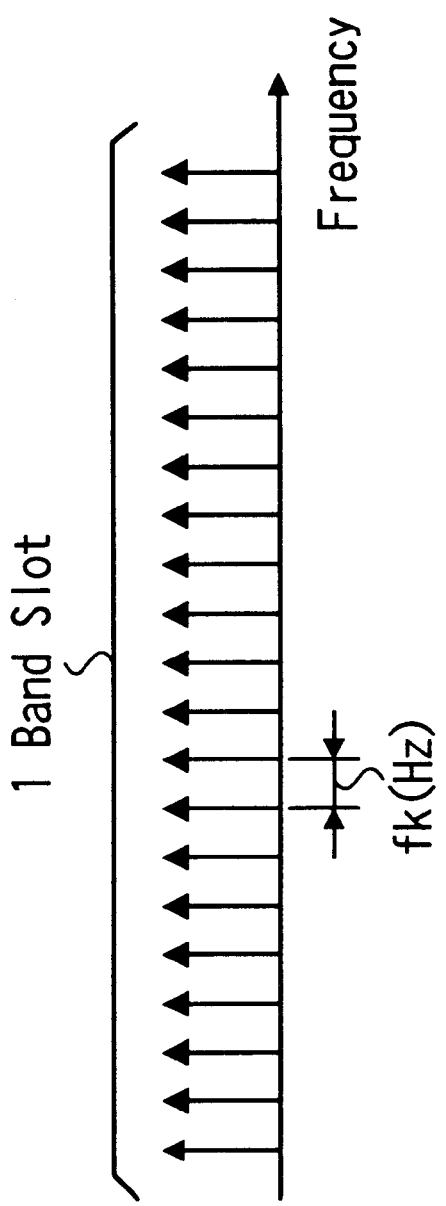
Figure 13B:
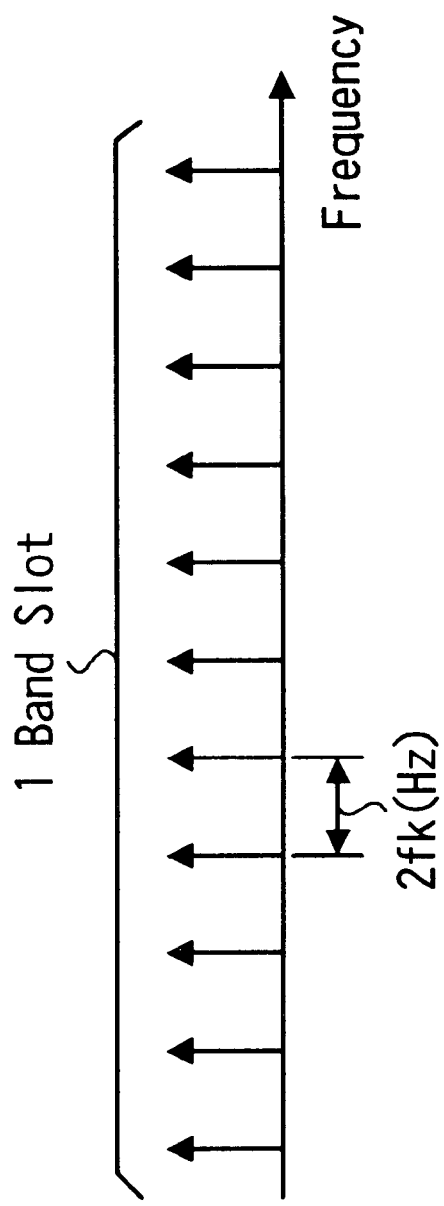

In addition, in the present embodiment, a multicarrier signal is transmitted. As described with reference to FIG. 1, one band slot is formed by 22 subcarriers, and, as indicated in FIG. 13A, a signal which is distributed among the 22 subcarriers at an interval of a frequency $f_k$ (intervals of 6.25 kHz in the example shown in FIG. 1) is arranged in one band slot to be transmitted. However, for a control channel, transmission may be performed with the above-described time slot period prolonged and the number of subcarriers reduced. Specifically, 22 subcarriers are transmitted in one band slot of a communication channel for transmitting audio data and the like as shown in FIG. 13A and, for a control channel, a signal which is distributed among the 11 subcarriers at an interval of a frequency $2_{fk}$ (interval of 12.5 kHz in the example shown in FIG. 1) which is a frequency interval twice that of a communication channel is provided in one band slot to be transmitted as shown in FIG. 13B. This process of expanding the frequency interval between the subcarriers can be carried out, for example, by performing a process of halving data which has been subjected to the fast Fourier transformation at the FFT circuit at the time of transmission.

By reducing the number of subcarriers forming one band slot of a communication channel to one-half of that of other channels in a control channel or the like to double the frequency interval between the subcarriers as indicated at in FIG. 13B the control channel becomes more likely to be in a better transmission state although the bit rate is reduced. For example, this allows a base station to receive more reliably data for acquiring an access right transmitted through an up link control channel from a terminal apparatus. When expanding the frequency interval between the subcarriers as described above, the frequency interval between carriers may be expanded by factors other than two, such as three and four or the like.

Such modification of the frequency interval between the subcarriers is not limited to expansion of the frequency intervals for both of up link and down link control channels, and it is possible to expand only the frequency interval of up link control channels as in the case of modification of a time slot period.

The values of the frequencies, the time, and the encoding ratios mentioned in the above-described embodiment are only illustrative, and the present invention is not limited to the above-described embodiment. Further, it is obvious that communication systems other than the band division multiple access (BDMA system) as described with reference to FIGS. 8 through 10 may be used. Especially, although the above-described embodiment is applied to a control channel in a communication system wherein a multi-carrier signal is transmitted, it is obviously applicable to the configuration of a control channel in a general time division multiple access system (TDMA system).

According to the present invention, the time slot period of a channel for acquiring an access right among up link channels from a terminal apparatus to a base station is made longer than the time slot periods of other channels. This makes it possible to transmit a signal for acquiring an access right to the base station in a relatively good state of communication and to reliably transmit such a signal to the base station even when a time alignment process or the like is not carried out.

In this case, by selecting an integer multiple of the time slot period of other channels as the time slot period of a channel for acquiring an access right, processes of transmitting and receiving the channel for acquiring an access right can be easily performed using circuits commonly used for transmission and reception processes over other channels.

Further, for communication through a channel for acquiring an access right, a timing process for achieving synchronization with a signal transmitted by the base station is not carried out and, for communication through other channels, the timing process for achieving synchronization with a signal transmitted by the base station is carried out. This makes it to possible to achieve both transmission that does not require the time alignment process in the channel for acquiring an access right and satisfactory transmission in a state wherein the time alignment process is carried out in other channels.

In addition, during transmission from a terminal apparatus, data having the same data length is transmitted in one time slot in either a channel for acquiring an access right or other channels. This allows a transmission system and a reception system for processing data in each time slot to be shared between a channel for acquiring an access right and other channels, thereby allowing the configuration of a base station and a terminal apparatus to be simplified. Furthermore, in a channel for acquiring an access right, allowance is obtained at the time of reception by an amount corresponding to the expansion of the time slot period to allow preferable reception in a state wherein no time alignment process is carried out.

Moreover, by transmitting a multi-carrier signal wherein a plurality of subcarriers are provided at predetermined frequency intervals in one transmission band, transmission utilizing a multi-carrier signal can be always preferably performed because a preferable time slot is set.

Still further, when communication is carried out by using such a multi-carrier signal, by making the frequency interval of the subcarriers of a channel for acquiring an access right wider than the frequency intervals of the subcarriers of other channels, there is provided a synergistic effect of the expansion of the time slot period and frequency intervals which allows more preferable transmission through the channel for acquiring an access right.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A communication method of carrying out communication using a time slot length as a unit, comprising the steps of:

communicating within a first time slot having a first time length when information of a first kind is communicated; and communicating within a second time slot having a second time length longer than said first time length and longer than a period of a burst signal for transmission or reception when communication control information is communicated.

2. The communication method according to claim 1, wherein said information of said first kind is generation information and said information of said second kind is communication control information.

3. A communication method of communicating information between a base station and a subscriber station in a cellular system using a time slot length as a unit, comprising the steps of:
communicating within a first time slot having a first time length when general information is communicated; and
communicating within a second time slot having a second time length longer than said first time length and longer than a period of a burst signal for transmission or reception when communication control information is communicated.

4. The communication method according to claim 3, wherein said communication control information is an access priority request signal from said subscriber station to said base station.

5. The communication method according to claim 3, wherein the second time length is N times (where N is an integer) as long as the first time length.

6. The communication method according to claim 3, wherein the second time length is set by said base station in said cellular system and information about said set second time length is transmitted from said base station to said subscriber station.

7. The communication method according to claim 3, wherein time alignment processing is not carried out when said communication control information is communicated and wherein time alignment processing is carried out when said general information is communicated.

8. The communication method according to claim 3, wherein said communicating steps employ a multi-carrier signal in which a plurality of sub-carriers are allocated in a predetermined frequency interval.

9. The communication method according to claim 3, wherein said communicating steps employ a multi-carrier signal in which a plurality of continuous sub-carriers in a predetermined frequency interval are allocated as a unit.

10. The communication method according to claim 9, wherein said communication control information is an access priority request signal from said subscriber station to said base station.

11. The communication method according to claim 9, wherein the second time length is N times (where N is an integer) as long as a length of the first time length.

12. The communication method according to claim 9, wherein the second time length is set by said base station in said cellular system and information about of said set second time length is transmitted from said base station to said subscriber station.

13. The communication method according to claim 9, wherein time alignment processing is not carried out when said communication control information is communicated and wherein time alignment processing is carried out when said general information is communicated.

14. A base station in a cellular system using a time slot length as a unit for communication to a subscriber station, comprising:
receiving means for receiving a reception signal from said subscriber station;
reception processing means for carrying out a processing of said reception signal using said time slot length having a first time length when general information is communicated and for carrying out a processing using said time slot length having a second time length, said second time length being longer than said first time length and longer than a period of a burst signal for transmission or reception, when communication control information is communicated;
signal generating means for generating a transmission signal to be transmitted to said subscriber station; and
transmitting means for transmitting said transmission signal generated by said signal generating means to said subscriber station.

15. The base station in said cellular system according to claim 14, wherein said communication control information is an access priority request signal from said subscriber station to said base station.

16. The base station in said cellular system according to claim 14, wherein the second time length is N times (where N is an integer) as long as the first time length.

17. The base station in said cellular system according to claim 14, wherein the second time length is set by the reception processing means and information about said set second time length is transmitted from said transmitting means to said subscriber station.

18. The base station in said cellular system according to claim 14, wherein said transmitting means transmits time alignment information to said subscriber station when said reception processing means processes said general information and does not transmit said time alignment information to said subscriber station when said reception processing means processes said communication control information.

19. The base station in said cellular system according to claim 14, wherein said reception signal and said transmission signal comprise a multi-carrier signal in which a plurality of sub-carriers are allocated in a predetermined frequency interval.

20. The base station in said cellular system according to claim 14, wherein said reception signal and said transmission signal comprise a multi-carrier signal in which a plurality of continuous sub-carriers in a predetermined frequency interval are allocated as a unit.

21. The base station in said cellular system according to claim 20, wherein said communication control information is an access priority request signal from said subscriber station to said base station.

22. The base station in said cellular system according to claim 20, wherein the second time length is N times (where N is an integer) as long as the first time length.

23. The base station in said cellular system according to claim 20, wherein said second time length is set by said reception processing means and information about said set second time length is transmitted from said transmitting means to said subscriber station.

24. The base station in said cellular system according to claim 20, wherein said transmitting means transmits time alignment information to said subscriber station when said reception processing means processes said general information and does not transmit said time alignment information to said subscriber station when said reception processing means processes said communication control information.

25. A subscriber station in a cellular system using a time slot length as a unit for communication to a base station, comprising:
reception means for receiving a transmission signal from said base station;
reception processing means for processing said transmission signal received by said reception means;
signal generating means for generating a return signal formed with said time slot length having a first time length when general information is communicated and for generating said return signal formed with said time slot length having a second time length, said second time length being longer than said first time length and longer than a period of a burst signal for transmission or reception, when communication control information is communicated; and transmitting means for transmitting said return signal generated by said signal generating means to said base station.

26. The subscriber station in said cellular system according to claim 25, wherein said communication control information is an access priority request signal from said subscriber station to said base station.

27. The subscriber station in said cellular system according to claim 25, wherein the second time length is N times (where N is an integer) as long as the first time length.

28. The subscriber station in said cellular system according to claim 25, wherein said second time length is set by said base station and information about said set second time length is received by said reception means from said base station, and said signal generating means generates said return signal based on said received information about said second time length.

29. The subscriber station in said cellular system according to claim 25, wherein said signal generating means generates said return signal based on time alignment information from said base station when said general information is generated and does not generate said return signal based on said time alignment information from said base station when said communication control information is generated.

30. The subscriber station in said cellular system according to claim 25, wherein said transmission signal and said return signal comprise a multi-carrier signal in which a plurality of sub-carriers are allocated in a predetermined frequency interval.

31. The subscriber station in said cellular system according to claim 25, wherein said transmission signal and said return signal comprise a multi-carrier signal in which a plurality of continuous sub-carriers in a predetermined frequency interval are allocated as a unit.

32. The subscriber station in said cellular system according to claim 31, wherein said communication control information is an access priority request signal from said subscriber station to said base station.

33. The subscriber station in said cellular system according to claim 31, wherein the second time length is N times (where N is an integer) as long as the first time length.

34. The subscriber station in said cellular system according to claim 31, wherein said second time length is set by said base station and information about said set second time length is received by said reception means from said base station, and said signal generating means generates said return signal based on said received information about said second time length.

35. The subscriber station in said cellular system according to claim 31, wherein said signal generating means generates said return signal based on time alignment information from said base station when said general information is generated and does not generate said return signal based on said time alignment information from said base station when said communication control information is generated.

36. A communication method of carrying out communication using a time slot length as a unit, comprising the steps of:

communicating within a first time slot having a first time length when information of a first kind is communicated; and communicating within a second time slot having a second time length of a fixed duration longer than said first time length and longer than a period of a burst signal for transmission or reception when communication control information is communicated.

37. A communication method of communicating information between a base station and a subscriber station in a cellular system using a time slot length as a unit, comprising the steps of:

communicating within a first time slot having a first time length when general information is communicated; and communicating within a second time slot having a second time length of a fixed duration longer than said first time length and longer than a period of a burst signal for transmission or reception when communication control information is communicated.

38. A base station in a cellular system using a time slot length as a unit for communication to a subscriber station, comprising:

receiving means for receiving a reception signal from said subscriber station;

reception processing means for carrying out a processing of said reception signal using said time slot length having a first time length when general information is communicated and for carrying out a processing using said time slot length having a second time length, said second time length being of a fixed duration longer than said first time length and longer than a period of a burst signal for transmission or reception, when communication control information is communicated;

signal generating means for generating a transmission signal to be transmitted to said subscriber station; and transmitting means for transmitting said transmission signal generated by said signal generating means to said subscriber station.

39. A subscriber station in a cellular system using a time slot length as a unit for communication to a base station, comprising:

reception means for receiving a transmission signal from said base station;

reception processing means for processing said transmission signal received by said reception means;

signal generating means for generating a return signal formed with said time slot length having a first time length when general information is communicated and for generating said return signal formed with said time slot length having a second time length, said second time length being of a fixed duration longer than said first time length and longer than a period of a burst signal for transmission or reception, when communication control information is communicated; and transmitting means for transmitting said return signal generated by said signal generating means to said base station.

* * * * *